UNITED STATES PATENT OFFICE.

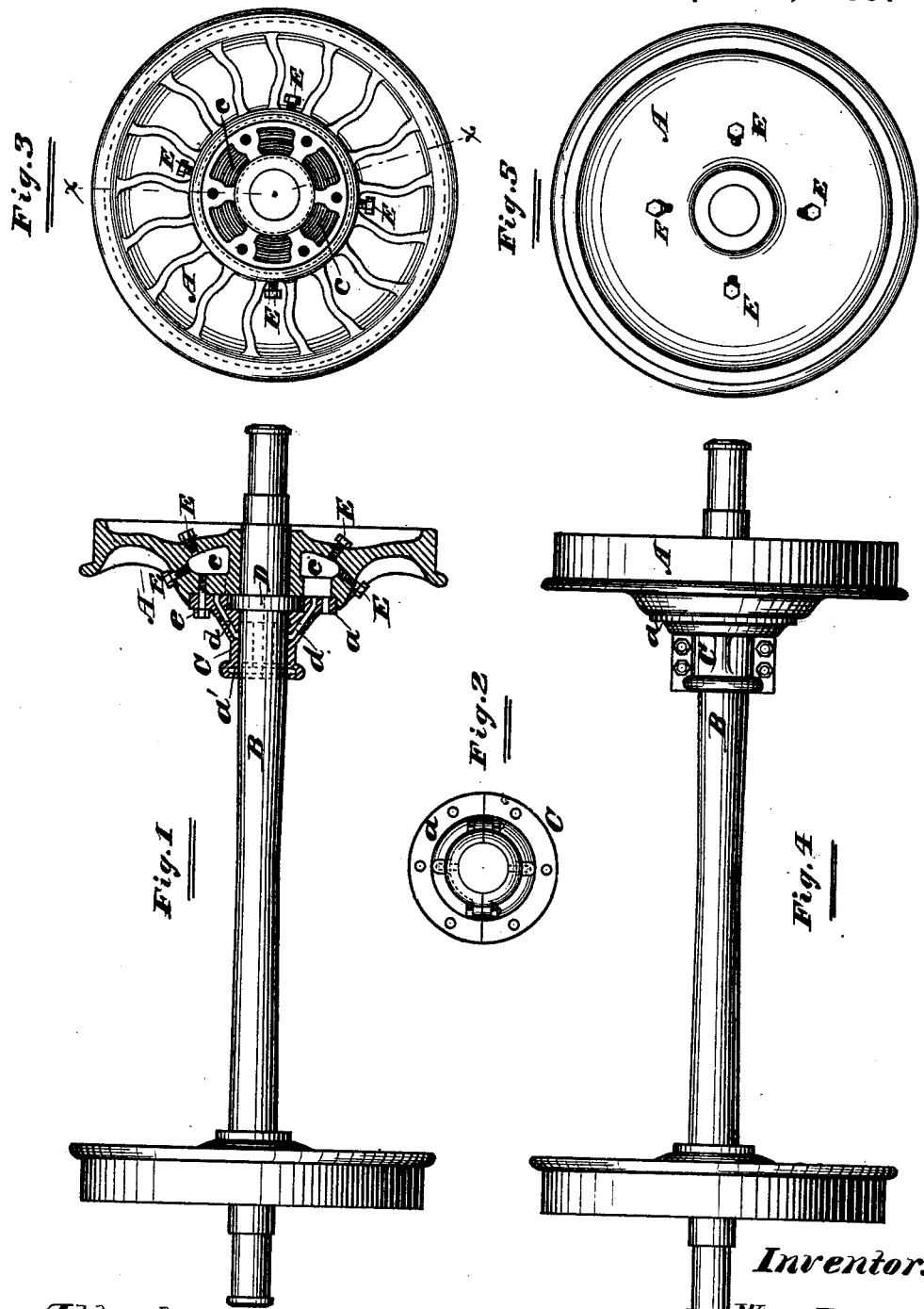

CHARLES C. NEIMEISTER AND WILLIAM AMERSON, OF CHICAGO, ILLINOIS.

IMPROVEMENT IN CAR-WHEELS.

Specification forming part of Letters Patent No. 219,824, dated September 23, 1879; application filed June 14, 1879.

*To all whom it may concern:*

Be it known that we, CHARLES C. NEIMEISTER and WILLIAM AMERSON, of Chicago, in the county of Cook and State of Illinois, have invented certain new and useful Improvements in Car Wheels and Axles, of which we hereby declare the following to be a full, clear, and exact description, which will enable others skilled in the art to which our invention appertains to understand, construct, and make use of the same, reference being had to the accompanying drawings, in which—

Figure 1 is a view of a car axle and wheels, showing the loose wheel in section on the line $x\ x$, Fig. 3; Fig. 2, a detail or end view of the sleeve when detached from the axle; Fig. 3, a view of the inner side of the loose wheel with the axle and sleeve removed; Fig. 4, a plan view; and Fig. 5, a view of the outer or reverse side of the loose wheel, as illustrated by Fig. 3.

Our invention has for its object the improvement of car wheels and axles; and relates to that class whose wheels turn independently of each other, and it is designed to permit the wheels to travel at different velocities when passing around curves or bends in the road.

Heretofore, in connecting wheels to the axles to turn loosely thereon the connecting devices have been of such a character as to require these parts to be especially constructed for the purpose, or the means employed to connect the parts together has been of such a complicated and expensive nature as to defeat the adoption of such improvements as being practical or useful.

In the drawings, A represents the body or web of the wheel, and B the axle. C is a close-fitting sleeve, to be constructed of cast-steel, and is made to slide onto the axle B on the inside of the loose wheel, as illustrated in Fig. 4 of the drawings.

D represents a collar placed upon the axle B, and may be constructed integral therewith or shrunk on, in the usual manner, the outer side of this collar forming a shoulder-bearing for the wheel, and the collar fitting into an annular recess in the flange $a$ of the sleeve C, and coming flush therewith when the latter is bolted to the wheel. This method of connecting these parts will prevent any longitudinal movement of the wheel or sleeve.

$c$ represents the space made by the removal of the core, and is used as a receptacle for the oil or other lubricating material. Thus the oil-house entirely surrounds the wearing parts, and the bearing-surface is in a constant state of lubrication. These connecting parts may be properly channeled, perforated, or tubes inserted to conduct the oil to the wearing-surfaces, for one of the most important and essential features to be taken into consideration and provided for in the construction of a device of this nature is the constant and regular lubrication of the wearing-surfaces.

$d$ represents oil channels or tubes placed in the rib formation of the sleeve C, and are for the purpose of conducting the oil from the oil-receptacle to that part of the axle inclosed by the sleeve C.

The annular groove $a'$ in the outer end of the sleeve C is provided for the reception of a collar or washer to be made of any elastic or flexible material that may be suitable for the purpose, preventing the oil from escaping, as well as excluding the dust and dirt from penetrating to the wearing-surfaces.

E are tap-bolts, which are inserted in the oil-holes on both sides of the loose wheel, as illustrated in Figs. 3 and 5 of the drawings. Having a series of oil-holes located at regular intervals and on both sides of the wheel readily admits of the parts being oiled from either side, and one or more oil-holes will always be in the right position to receive oil, no matter at what point the wheel may stop.

We do not strictly confine ourselves to the employment of tap-bolts for the purpose of closing the oil-holes, but may make use of a close-fitting cap held in place by a spring.

$e$ are tap-bolts inserted in the flange $a$ of the sleeve C, and by means of these bolts the sleeve is firmly and securely attached to the car-wheel.

This form of construction admits of convenient and easy access to the parts for examination and repairs, and by simply releasing the sleeve from the wheel the same can be slipped back on the axle and the parts inspected to see that they are in good working condition.

The loose wheel can likewise be easily removed from the axle without any other interference with the truck, and the sleeve, being formed longitudinally in two parts, can be removed and replaced without taking off the wheel.

Having thus described our invention, what we claim, and desire to secure by Letters Patent, is—

In a loose car-wheel, the combination of the following elements, viz: the axle B, the collar D, the loose wheel A, provided with the oil-receptacle, as herein described, and the adjustable sleeve C, having the flange $a$, provided with the annular recess for the reception of the collar D, the rib formation having on the interior thereof the oil-channels $d$ and the annular groove $a'$, all arranged, combined, and operating substantially as herein described.

CHARLES C. NEIMEISTER.
WILLIAM AMERSON.

Witnesses:
L. A. BUNTING,
L. B. COUPLAND.